United States Patent [19]

Klassen et al.

[11] Patent Number: 5,649,071
[45] Date of Patent: Jul. 15, 1997

[54] IMAGE PROCESSING METHOD TO REDUCE MARKING MATERIAL COVERAGE IN SEQUENTIAL COLOR PRINTING PROCESSES

[75] Inventors: R. Victor Klassen, Webster; Steven J. Harrington, Holley, both of N.Y.

[73] Assignee: Xerox Corporation, Stamford, Conn.

[21] Appl. No.: 313,520

[22] Filed: Sep. 26, 1994

[51] Int. Cl.[6] .............................. G06K 15/00; H04N 1/46
[52] U.S. Cl. ........................ 395/109; 358/504; 358/517; 347/251
[58] Field of Search ..................... 395/109, 108, 395/117; 358/518, 526, 515, 517, 534, 504, 298; 347/24, 43, 78, 251; 382/167, 163

[56] References Cited

U.S. PATENT DOCUMENTS

| | | | |
|---|---|---|---|
| 4,649,500 | 3/1987 | Yamada et al. | 358/502 |
| 4,763,190 | 8/1988 | Froelich | 358/79 |
| 4,930,018 | 5/1990 | Chan et al. | 358/298 |
| 4,999,646 | 3/1991 | Trask | 346/11 |
| 5,014,123 | 5/1991 | Imoto | 358/75 |
| 5,237,344 | 8/1993 | Tasaki et al. | 346/140 R |
| 5,305,119 | 4/1994 | Rolleston et al. | 358/522 |
| 5,335,315 | 8/1994 | Yoshida et al. | 395/109 |
| 5,425,134 | 6/1995 | Ishida | 395/109 |
| 5,493,323 | 2/1996 | Harrington | 347/251 |
| 5,515,479 | 5/1996 | Klassen | 395/109 |
| 5,519,815 | 5/1996 | Klassen | 395/109 |
| 5,563,985 | 10/1996 | Klassen et al. | 395/109 |

OTHER PUBLICATIONS

J.A.C. Yule; "Principles of Color Reproduction"; J. Wiley & Sons, 1967.

Klassen; "Reducing Ink Coverage Levels in Binary CMYK Images"; Proc. Soc. Imaging Science & Technology; 46th Annual Conference; May 1993.

T.G. Lewis et al.; "Generalized Feedback Shift Register Pseudorandom Number Algorithm"; Journal of the Association for Computing Machinery, vol. 20, No. 3, Jul. 1973; pp. 456-468.

H.S. Bright et al.; "Quasi-Random Number Sequences from a Long-Period TLP Generator with Remarks on Application to Cryptography"; Computing Surveys, 11, 4, 1979.

*Primary Examiner*—Dwayne Bost
*Assistant Examiner*—Tracy M. Legree
*Attorney, Agent, or Firm*—Mark Costello

[57] ABSTRACT

A method of processing images preparatory to printing in a color printer adapted to printing serial color separations, that when superposed form the final color image, in which separation color images are received for printing defined by continuous tone separation signals, which are color corrected and halftoned preparatory to printing the color image. The received continuous tone separation image signals are used to derive an estimate of marking material coverage. The marking material coverage estimate is subsequently used in association with random number generation to turn OFF otherwise ON pixels in each separation as the separation is printed for the reduction of marking material coverage.

15 Claims, 5 Drawing Sheets

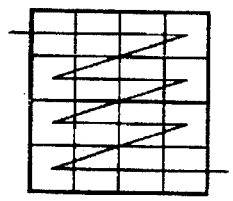
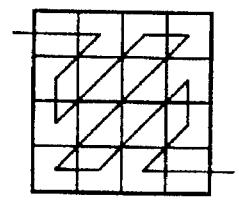
FIG. 3A   FIG. 3B
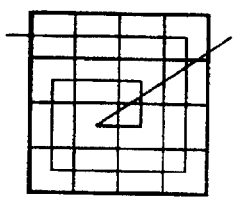
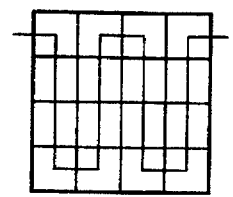
FIG. 3C   FIG. 3D
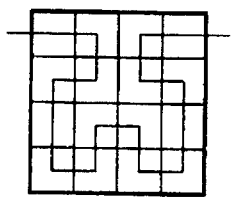
FIG. 3E

IMAGE PROCESSING METHOD TO REDUCE MARKING MATERIAL COVERAGE IN SEQUENTIAL COLOR PRINTING PROCESSES

This invention relates to an image processing method for reducing the amount of marking material required to print a colored image, to avoid problems common to the use of excessive amounts of ink.

CROSS REFERENCE

Cross Reference is made and priority is claimed from U.S. patent application Ser. No. 07/917,643 to Klassen filed Jul. 23, 1992, U.S. patent application Ser. No. 08/158,874 to Klassen filed Nov. 29, 1993, and U.S. patent application Ser. No. 08/177,494 to Klassen et al. filed Jan. 5, 1994.

BACKGROUND OF THE INVENTION

Full color printing has become a desired goal of office products. Two different types of full color printers which have significant potential for fulfilling such goals are the ink jet printer and the electrophotographic printer. Color printing is accomplished by providing multiple layers, or separations, of ink on a page. Commonly, colors are provided by subtractive combinations of cyan, magenta and yellow inks. To print black, a combination of equal amounts of cyan, magenta and yellow is printed, or a fourth black ink is used as a substitute. Undercolor removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, *Principles of Color Reproduction*. (John Wiley & Sons, Inc., New York, 1967), pages 294–327.

Generally, printers can deposit colors in one of two processes: 1) all four colors can be deposited at about the same time in parallel processing arrangement (common, although not required or limited to color ink jet printers), or 2) all four colors can be deposited sequentially in a serial processing arrangement (common, although not required or limited to color electrophotographic printers). Combinations of these two methods are possible.

A problem of color printers generally is that when too much marking material is used, undesirable image artifacts and printing defects occur. In liquid marking material printers such over coverage is characterized by the problems of ink puddling or pooling, bleeding to adjacent image areas, and flow through to the back side of the receiving material. Paper cockle is also a problem due to saturation of the paper receiving material and subsequent rapid drying. In powdered marking material printers, paper curl and cockle is caused by differential shrinkage of toner and paper in the printing process. In both liquid marking and powder marking printers, coverage reduction as in U.S. patent application Ser. No. 07/917,643 by Klassen, filed Jul. 23, 1992, reduces marking material coverage in documents including heavily saturated regions of continuous tone images (see also, Klassen, "Reducing Ink Coverage Levels in Binary CMYK Images", Proc. Soc. Imaging Science and Technology, 46th Annual Conference (May, 1993), pp. 173–175). To prevent artifacts from occurring in the pixel reduction step, a processing path through each given area is used which tends to "randomize" the turn off effect. However, this process assumes the availability of binary print driver signals. For cost reasons, it is usually desirable for the process to operate irrespective of image content, or on the separation binary bitmaps without further image information.

In sequential separation printing machines, particularly characterized by electrophotographic printers such as the Xerox 5775 Digital Color Copier, while all four separations are available in the original continuous tone format (e.g., multibit signals, typically 8 bits per separation pixel), only the separation being currently marked is available in bitmap format, taking into account color correction and halftoning (for a more complete discussion of color correction, see, for example U.S. Pat. No. 5,305,119 to Rolleston et al.; U.S. Ser. No. 08/131,168, filed Oct. 4, 1993, entitled "Reduced Storage of Pre-Computed Difference Tables Used In Color Space Conversion", by R. J. Rolleston (assigned to the same assignee as the present application); U.S. Ser. No. 08/144,987, filed Oct. 29, 1993, entitled "Color Printer Calibration Test Pattern" by R. J. Rolleston et al. (assigned to the same assignee as the present application); U.S. Ser. No. 08/179,284, filed Jan. 10, 1994, entitled "Color Printer Calibration Architecture", by R. J. Rolleston et al. (assigned to the same assignee as the present application); U.S. Ser. No. 08/223,494, filed Apr. 5, 1994, entitled "Color Printer Calibration with Improved Color Mapping Linearity", by R. J. Rolleston (assigned to the same assignee as the present application); and U.S. Ser. No. 08/254,629, filed Jun. 6, 1994, entitled "Color Printer Calibration with Blended Lookup Tables", by R. J. Rolleston et al. (assigned to the same assignee as the present application). Since processes previously described for coverage reduction assume the presence of the entire image in a print ready format, they can base reduction actions on multiple separations. However, if a process has only a single separation in a print ready format, the reduction process cannot refer to other separations.

Tasaki and Shiga (U.S. Pat. No. 5,237,344) describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters: arbitrary fonts and shapes, such as are requested in documents created using industry standard page description languages e.g. PCL or PostScript, cannot be handled in this way.

U.S. Pat. No. 4,930,018 to Chan et al. teaches reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red—green—blue) images and performs RGB-CMYK (cyan—magenta—yellow key or black) conversion with full under color removal. As understood, printing is performed at half resolution, so that "pixels" in the input image correspond to 2×2 blocks in the output image. The image data is first error diffused from 8 bits per pixel per separation to 4 bits pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are cyan, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

The above-identified references are incorporated by reference for their teachings.

SUMMARY OF THE INVENTION

In accordance with the invention, there is provided a method for reducing the amount of marking material used in a printer for full color images while minimally affecting the appearance of the color image, using continuous tone separation signals.

In accordance with one aspect of the invention, in a color printer, at which plural separation color images are received for printing defined by continuous tone separation signals, which are color corrected and halftoned preparatory to printing the color image, the received continuous tone separation image signals are used to derive an estimate of marking material coverage. The marking material coverage estimate is subsequently used in association with random number generation to turn OFF otherwise on pixels in each separation as the separation is printed for the reduction of marking material coverage.

In accordance with another aspect of the invention, there is provided a method for processing a color image for reproduction at a printer which serially prints colorant separations, to reduce an amount of marking material used therefor, the color image including a plurality of separations each defined by continuous tone pixels, including the steps of: receiving the color image to be reproduced; preparing the color image for reproduction, by generating a set of continuous tone colorant separations, suitable for driving a printer to reproduce the color image; from the plurality of the separations, generating a set of halftoned colorant separations defined by on/off pixels; for the continuous tone set of colorant separations, summing the pixel values at corresponding locations in each colorant separation therein, to determine marking material coverage; comparing desired marking material coverage with measured marking material coverage to derive a turn-OFF ratio, where the turn-OFF ratio represents a fraction of pixels to be turned OFF in the halftoned set of colorant separations; setting a fraction of pixels to OFF in the halftoned set of colorant separations, in accordance with the turn-OFF ratio; and outputting the altered halftoned set of colorant separations to a printer.

Generally, coverage reduction can be considered to have two parts, a first estimation phase, where the amount of coverage reduction is determined, and a second depletion phase, where coverage reduction is applied to the binary image. In U.S. patent application Ser. No. 07/917,643 to Klassen filed Jul. 23, 1992, U.S. patent application Ser. No. 08/158,874 to Klassen filed Nov. 29, 1993, and U.S. patent application Ser. No. 08/177,494 to Klassen et al. filed Jan. 5, 1994, the operation was applied to bitmaps ready for printing. If undercolor removal or gray component replacement was to be applied, the image had already been altered accordingly. However, if coverage reduction is to be accomplished before all the bitmaps are prepared, it must take into account color correction, including undercolor removal or gray component replacement.

The present invention recognizes that an approximation of coverage can be simply obtained through a conversion of the continuous tone separation signals to colorant signals, without the necessity of generating an accurate bitmap image. The obtained estimate can then be used to drive the depletion phase for all four bitmaps that are subsequently generated.

These and other aspects of the invention will become apparent from the following descriptions to illustrate a preferred embodiment of the invention read in conjunction with the accompanying drawings in which:

FIGS. 3A–3E show possible space filling curves for visiting pixels to apply coverage reduction;

Figure 1:
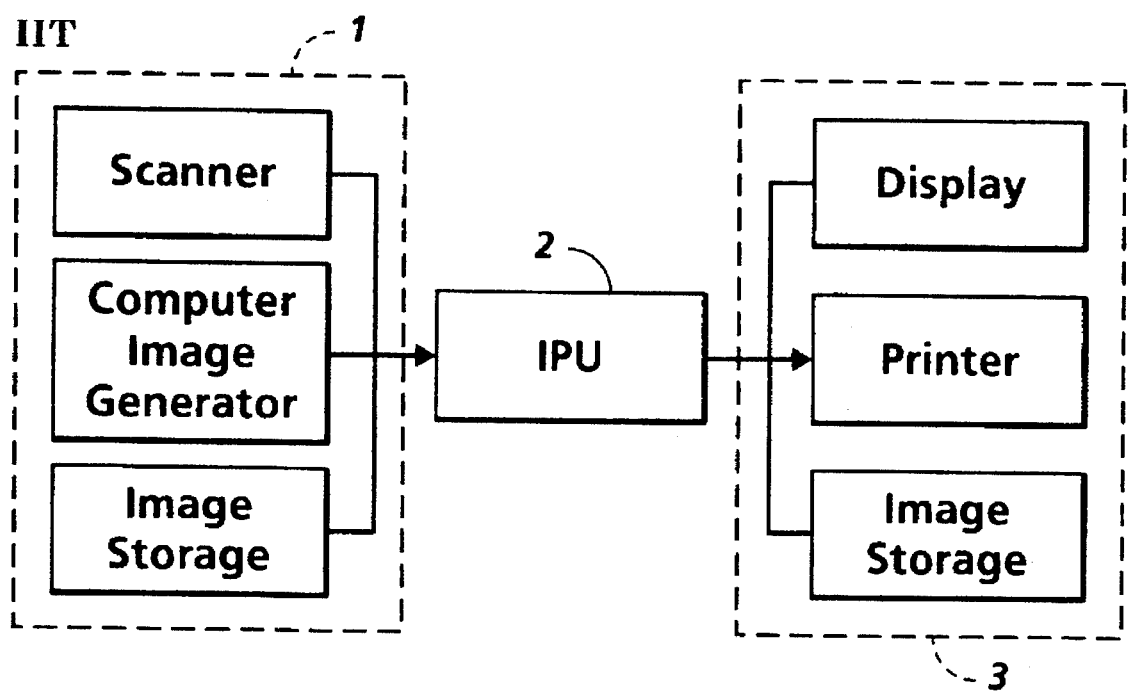
FIG. 1 is a block diagram of a system in which the present invention may find use.

Referring now to the drawings where the showings are for the purpose of describing the preferred embodiment of the invention and not for limiting same, a basic functional block diagram for a system for carrying out the present invention is shown in FIG. 1. In the present case, continuous tone ("contone") image data from image input terminal (hereinafter, IIT) 1 may be characterized as image data, each pixel of which is defined at a single level or optical density in a set of 'c' optical density magnitudes or levels, the number of members in the set of levels being larger than desired. The number of desired levels is given by the capabilities of printer 3, or by system considerations. Each pixel from IIT 1 will be processed at image processing unit (hereinafter, IPU) 2 in the manner described hereinbelow, to prepare the image for an appropriate output device 3. In this case, the output devices of concern are binary printers.

Figure 2:
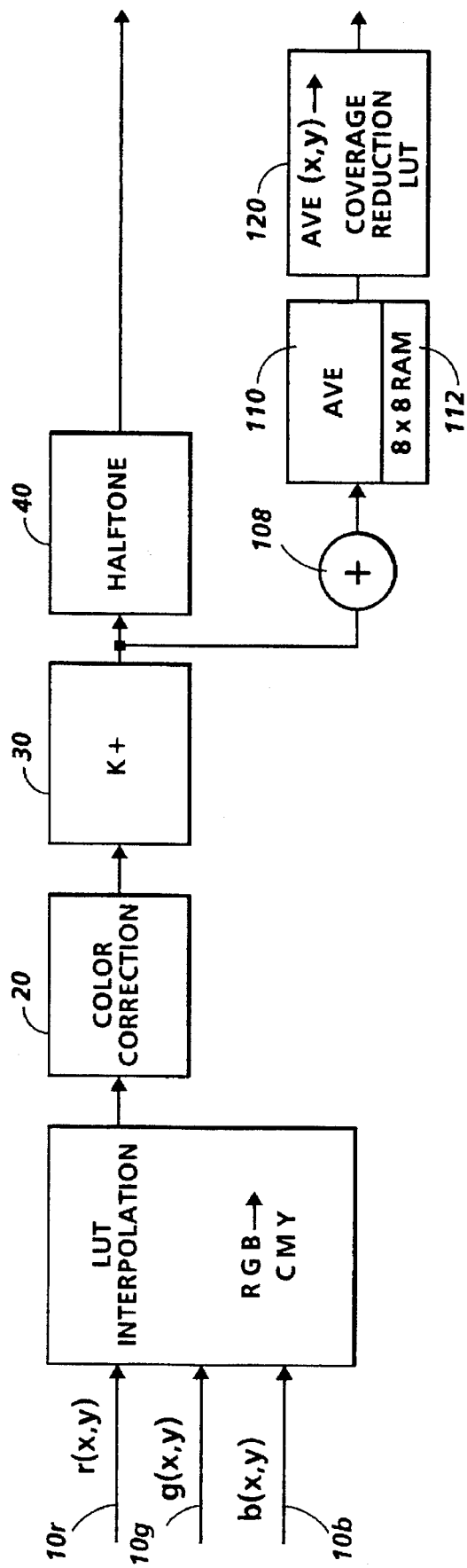
FIG. 2 is a functional block diagram of a system for carrying out the present invention.

With reference now to FIG. 2, a plurality of video inputs 10r, 10g, 10b, each representing one of red, green or blue contone separation images, are directed into an IPU 2 including the inventive coverage reduction system. In this arrangement, the separation contone images may be characterized as image signals, each pixel of which is defined at a single level or optical density in a set of 'c' optical density levels. For printing, each pixel will be processed in the manner redefining each pixel in terms of a new, smaller set of 'd' levels and in terms of a colorant. In this process, 'c' and 'd' are integer values representing pixel depth, or a number of signal levels at which the pixel may appear.

In the particular color system to be discussed, color documents are represented by multiple sets of image signals, each set (or separation) represented by an independent channel, which is usually processed independently and perhaps sequentially. A "color image" as used herein is therefore a document including at least two separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a scanner/printer combination) is described, for example, in U.S. Pat. No. 5,014,123, incorporated herein by reference. Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Continuous tone" or "contone", as used herein refers to image signals which vary between maximum and minimum, irrespective of the color of the separation in which the signals are used, and is represented with a finite number (such as 8) of bits.

Common color scanners, such as, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth.

Initially noted in FIG. 2 is a standard printing path for color image $I_{RGB}(X,Y)$, composed of contone separations signals $r(x,y)$, $g(x,y)$ and $b(x,y)$ and using a lookup table and interpolation processor 20, converts rgb space signals signals to CMY (cyan, magenta, and yellow) colorant space signals. At color correction 30, the images are gray balanced, UCR is applied and TRC is corrected. At black signal generator (K+) 40 a black colorant signal is generated, commonly based on the overall density of the separations when considered together. At halftone 40, the contone colorant signals are processed so that signals representing the image are printable by whatever printing system is used. The output of this system is commonly provided in serial form so that separations can be serially printed. The above system is only given for example purposes and can be modified in many ways.

In accordance with the invention, initially, a coverage estimate is obtained. The signals selected for processing are the color corrected contone signals present in the system, preferably after K+. At signal adder 108, the contone signals $C(x,y)$, $M(x,y)$, $Y(x,y)$ and $K(x,y)$ are added together, so that the color pixel density is evaluated. At averaging circuit 110, a value $P_{ave}$ is obtained for each color pixel based on averaging the 8×8 neighborhood surrounding the color pixel to obtain an average coverage in the region. RAM memory 112 may be provided to store that 8×8 neighborhood. That average value is directed to a LUT 120, perhaps also provided in RAM memory mapping average values to coverage reduction requirements specified as a turn-OFF ratio $d(x,y)/_m$ the ratio of the desired coverage level to the measured coverage level. It will also be appreciated trial that this value could be provided by a calculating circuit, which calculates such values on the fly. Preferably, LUT table 120 or calculating circuit calculates such values based on specific machine coverage measurements that take into account the ink, paper and machine hardware used.

Figure 4:
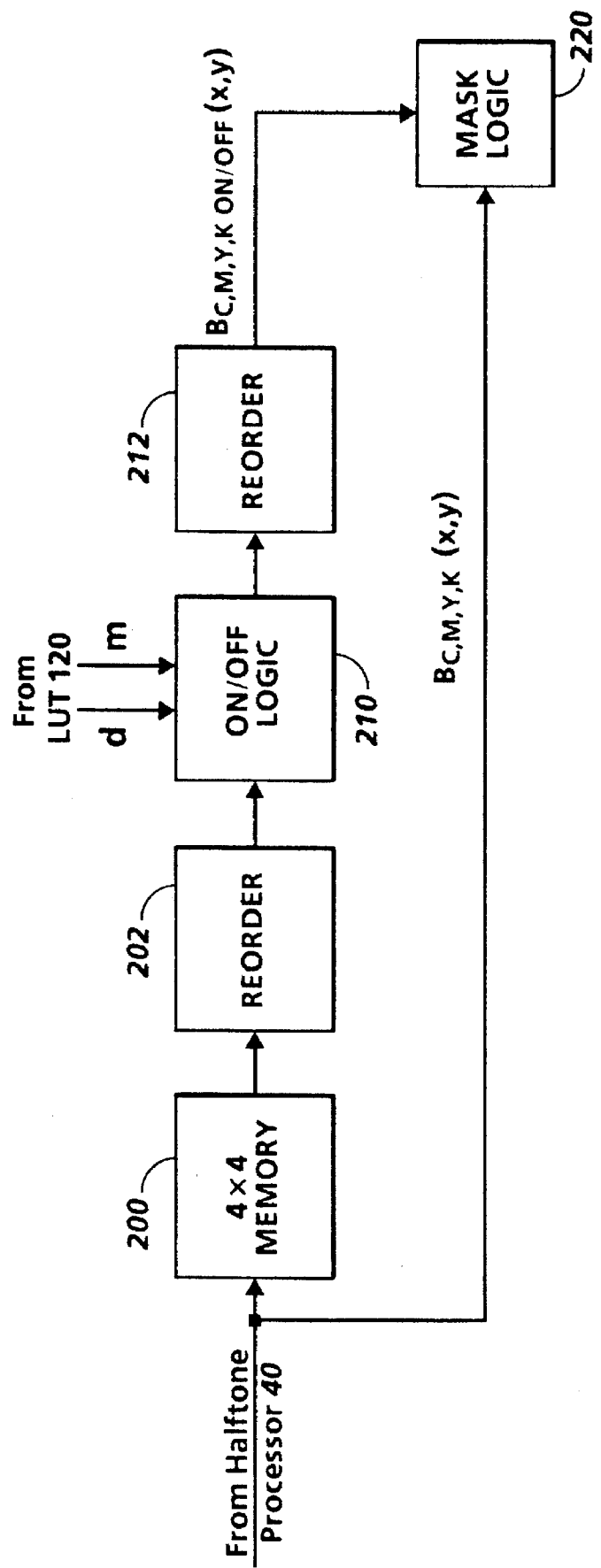
FIG. 4 illustrates the ON/OFF logic used for coverage reduction.

As applied to bitmap $B_{CMYK}(x,y)$ the "turn-OFF ratio" of $d(x,Y)/_m$ would result in a periodic pattern, which, when imposed on a halftone pattern, would result in undesirable moiré patterns in the reproduction of the image. Accordingly, one method of alleviating this problem is to randomize the application of the turn-OFF ratio to the bitmap. However, it is also desirable that the determination of ON or OFF be made with knowledge of the determination for adjacent pixels, so that the application of the turn-OFF ratio can be applied uniformly through the given area. Accordingly, and with reference to FIGS. 3A–E, where FIG. 3A shows the usual method of progressing through a bitmap, processing pixels 1 to n, from scan line 1 to scan line k, FIGS. 3B–E show other processing orders (shown for only 4×4 areas, as will be explained below), with a preferred processing order being the area filling curve of FIG. 3E. It will no doubt be appreciated that other processing orders are possible, which process pixels in an order that is relatively random with respect to common halftone patterns, and retains dependence on adjacent pixels. With reference now to FIG. 4, ordering of pixels is accomplished by storing a 4×4 set of pixels for which m has been determined in memory 200, and subsequently reading the values of $B_{CMYK}$ (x,y) out of memory with processing order control 202, which reorders pixels of $B_C(x,y)$ in accordance with the selected pixel order function.

Once a turn-OFF ratio d/m for an 8×8 set of pixels is determined, that ratio is applied to a 4×4 pixel grouping of the halftoned image, processed in accordance with the process ordering of FIGS. 3B–E. The use of an 8×8 area for determining the turn-OFF ratio smooths abrupt changes which might occur if a smaller area is used for that determination.

At coverage reduction logic 210, a logical process is employed implementing the determined turn-OFF ratio. The fraction of pixels to be left ON is the ratio of the desired coverage to the measured coverage. Pixels are spaced as uniformly as possible along the path that gives the order in which they are visited. One way of ensuring this uniformity is as follows:

```
f = 0
for each pixel that is on in this separation
    f = f + d/_m;
    if(f ≥ 1)
        turn on this pixel
        f = f - 1
next pixel.
```

The control variable f, represents the fraction of the distance along the path that the current pixel is from the last pixel to be turned on to the next pixel to be turned on. It will be noted that this logic is similar to Bresenham's algorithm for drawing lines, which for computer graphics determines the distance along a first axis, before a step must be made in the second axis for a line extending in two axes.

If the control variable f, is initialized only at the start of the page, and not in each window, the average over a larger region will be correct. By scaling f by m, the use of non-integer values is eliminated. The initial setting of f to zero is arbitrary, as over an entire image the initial value of f is of no consequence (so long as it is not too far from 0). To reduce inter-separation correlations it may be advantageous to use various values between −m and m for the initial settings of the control variable for different separations. The comparison with m is also arbitrary: as long as it is compared with a constant value, the test will succeed, on average, the appropriate fraction of the time. Furthermore, if it is compared with an unbiased random number, the uniformity will be preserved, in the long run, but disturbed locally, reducing the potential for patterns. From all of these considerations, the following method derives:

```
f = −m
for each pixel that is ON in this separation
    f = f + d;
    generate a random number r
    if(f ≧ r)
        turn on this pixel
        f = f − m
next pixel.
```

To obtain random numbers with a suitably even distribution at high speed, the method of Lewis and Payne (Lewis, T. G. and W. H. Payne, "Generalized Feedback Shift Register Pseudorandom Number Algorithm", Journal of the Assn. for Computing Machinery, Vol. 20, No. 3 (1973), pp. 456–468) is adapted. The method generates a stream of one bit random numbers with a period of $2k^{-1}$, using a shift register of k bits. One choice is k=31, a Mersenne prime as recommended by Bright and Enison (Bright, H. S. and R. L Enison, "Quasi-Random Number Sequences from a Long-Period TLP Generator with Remarks on Application to Cryptography", Computing Surveys, 11, 4, 1979). On each cycle, the register is shifted one to the right, the low order bit having first been XORed with the twelfth bit left from the lowest order. This new value (the result of the XOR) is shifted in from the left, and used as the current one bit random number. By running a number p of these in parallel, suitably shifted, and selecting 6 of the kp bits, a six bit random number is generated. A different concatenation of 6 bits is selected for each of the four separations. A new random number can be generated every clock cycle. If the seed k is varied as each separation is processed, correlations between separations will be eliminated.

Figure 5:
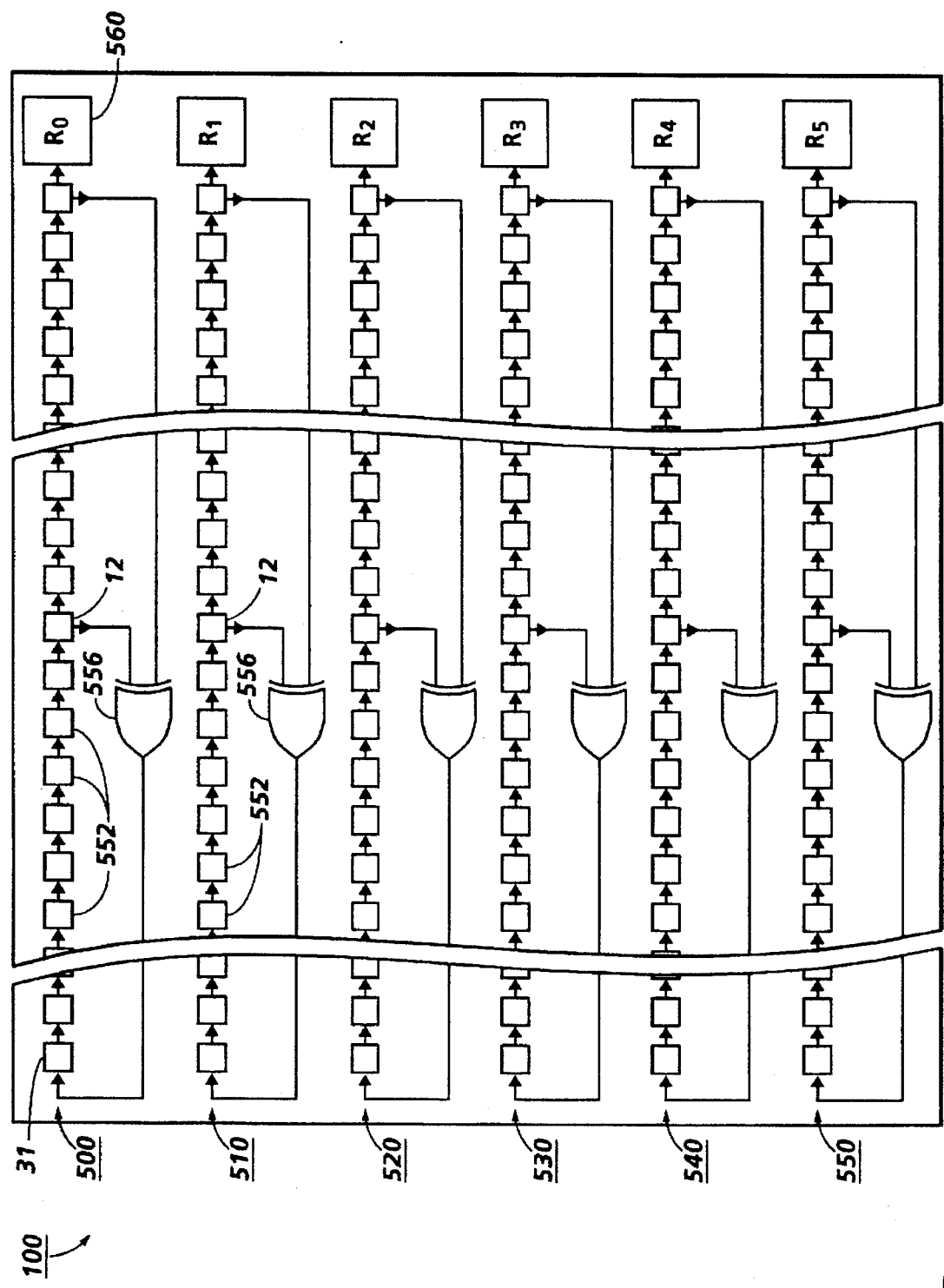
FIG. 5 shows a random number generator useful in the described embodiment.

A hardware implementation of the random number function is illustrated at FIG. 5, where a random number generator is illustrated for unsigned random numbers in the range of 0 . . . 63. If these are treated as signed, the numbers are −32 . . . 31. Shift registers 500–550 each include a set of 31 data latches 552, which have an ON or an OFF state indicated as 1 or 0. The zeroth, and twelfth latch (counting from the zeroth latch) are connected to XOR gate 556, with the output thereof stored to the 31st latch. The zeroth latch is connected to an output latch 560, which forms one bit ($R_0$) of a 6 bit number {$R_0$, $R_1$, $R_2$, $R_3$, $R_4$, $R_5$,} which forms R. Here follows a software routine in C code for a software implementation:

```
#define p 31
#define q 13
#define INTSIZE 8
#define ONE 1 < <(INTSIZE−1)
static unsigned char W[p] =
```

-continued

```
{62,41,158,143,57,145,72,198,168,123,152,31,86,
92,155,40,165,184,96,114,165,65,22,82,237,234,120,217,16
4,97,176,};
char gfsr( )
{
    static int k = 0;
    static int j = q;
    if(+ +k = = p)k = 0;
    if(+ +j = = p)j = 0;
    W[j] ^= W[k];
    return W[j];
}
```

The W array is the shift registers. Each element of the array is equivalent to a column of the latches in FIG. 3; the concatenation of the ith bits of all of them represents a single 31 bit shift register. The indices j and k point at the virtual low order (0th) bit and twelfth bits. (The difference being 13.) At each step, both of these indices advance, wrapping around to zero when they need to (this simulates the effect of shifting). The last step is to perform the exclusive or the twelfth element of the virtual shift register with the 0th element. All eight shift registers are exclusive ORed at once, due to the arrangement of the data.

With reference again to FIG. 4, at block 212, the function is reordered into the original image order as $B_{CMYKON/OFF}$ (x,Y), which is a mask representing the turn OFF function.

Accordingly, a set of ON/OFF conditions is created for a 4×4 area of the halftoned image, reducing the number of ON pixels in that area in accordance with the determining turn-OFF ratio, $B_{CMYKON/OFF}(x,Y)$. This set of values is then used as an input to a masking logic 220, which uses $B_{CMYKON/OFF}(x,Y)$ in altering the bitmap $B_{CMYK}(x,y)$ at block 42 from which the now adjusted image is directed to a printer.

It may be appreciated that, in some systems, it may not be possible to obtain the continuous tone image signals after color correction for deriving the turn-OFF ratio. In such cases, it may be acceptable and desirable to derive an approximate or gross calculation of the continuous tone image, perhaps including UCR and/or K+. In such arrangements, the output of such derivation would be processed in essentially the same manner as the data derived from the actual continuous tone values directed to the halftoning system.

It will no doubt be appreciated that the present invention may be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method for using continuous tone data for processing a color image to reduce an amount of marking material used for reproduction at a printer which serially prints colorant separations, the color image including a plurality of separations each defined by contone pixels, including the steps of:

receiving the color image to be reproduced;

preparing the color image for printing, by generating a set of continuous tone colorant separations, suitable for driving a printer to reproduce the color image;

from the plurality of contone colorant separations, serially preparing a halftoned set of colorant separations;

for the set of contone colorant separations, summing the pixel values at corresponding locations in each colorant separation therein, to determine marking material coverage;

comparing desired marking material coverage with measured marking material coverage to derive a turn-OFF ratio, where the turn-OFF ratio represents a fraction of pixels to be turned OFF in the first set of colorant separations;

setting a fraction of pixels to OFF in the halftoned set of colorant separations, in accordance with the turn-OFF ratio; and outputting the altered halftoned set of colorant separations to a printer.

2. The method as defined in claim 1, wherein the step of preparing the color image for printing includes color correction.

3. The method as defined in claim 1, wherein color correction includes under color removal and black addition.

4. The method as defined in claim 1, wherein the step of setting a fraction of pixels to OFF in the halftoned set of colorant separations, in accordance with the turn-OFF ratio uses randomness.

5. The method as defined in claim 1, wherein the step of comparing desired marking material coverage with measured marking material coverage to derive a turn-OFF ratio includes the substeps of generating an average coverage value over a preselected group of pixels.

6. The method as defined in claim 5, including the step of using the generated average coverage value as an address to a look up table memory, mapping address values to precalculated turn-OFF ratios.

7. The method as defined in claim 1, wherein the received color image is defined in terms of R,G,B (red, green, blue) color space.

8. An image processing system, for processing a color image for reproduction at a printer which serially prints colorant separations, operating on continuous tone data derived from a color image to reduce an amount of marking material used therefor, the color image including a plurality of separations each defined by contone pixels, comprising:

a color image input, receiving color images to be reproduced;

a first processor preparing the color image for printing, by generating a set of continuous tone colorant separation signals;

a halftone processor operating on said continuous tone colorant separations, to serially prepare a halftoned set of colorant separations, suitable to drive a printer to reproduce the color image;

a coverage reduction processor including a. a signal adder, summing continuous tone colorant separation signals at corresponding locations in the contone colorant separations, to determine marking material coverage;

b. a comparator comparing predefined desired marking material coverage with determined marking material coverage and producing a turn-OFF ratio, where the turn-OFF ratio represents a fraction of pixels to be turned OFF in the first set of colorant separations;

c. turn-off logic, producing a mask signal indicating locations for setting pixels to OFF in the first set colorant separations, in accordance with the turn-OFF ratio;

a masking logic circuit, responsive to the mask signal and the halftoned set of colorant separations to set ON pixels to OFF in the first set colorant separations, in accordance with the turn-OFF ratio;

an outputting circuit for transmitting the altered first set colorant separations to a printer.

9. The device as defined in claim 8, wherein the first processor includes a color correction processor.

10. The device as defined in claim 8, wherein the color correction processor includes under color removal and black addition functions.

11. The device as defined in claim 8, wherein the turn off logic setting a fraction of pixels to OFF in the halftoned set of colorant separations, in accordance with the turn-OFF ratio is based on a random number generator.

12. The device as defined in claim 8, wherein the comparator comparing desired marking material coverage with measured marking material coverage to derive a turn-OFF ratio includes an average value circuit generating an average coverage value over a preselected group of signals.

13. The device as defined in claim 12, wherein said average value circuit directs the generated average coverage value as an address to a look up table memory, mapping address values to precalculated turn-OFF ratios.

14. The device as defined in claim 8, wherein the received color image is defined in terms of R,G,B (red, green, blue) color space.

15. An image processing system, for processing a color image for reproduction at a printer which serially prints colorant separations, operating on continuous tone data derived from a color image to reduce an amount of marking material used therefor, the color image including a plurality of separations each defined by continuous tone pixels, comprising:

means for receiving the color image to be reproduced;

means for preparing the color image for reproduction, by serially generating a first set of continuous tone colorant separation signals, means for halftoning said continuous tone colorant separation signals, to generate print signals suitable for driving a printer to reproduce the color image;

means for summing the continuous tone colorant separation signal values at corresponding locations in each colorant separation therein, to measure marking material coverages;

means for comparing desired marking material coverage with measured marking material coverage to derive a turn-OFF ratio, where the turn-OFF ratio represents a fraction of pixels to be turned OFF in the first set of colorant separations;

means for randomly setting a fraction of pixels to OFF in the first set colorant separations, in accordance with the turn-OFF ratio; and means for outputting the altered first set colorant separations to a printer.

* * * * *